United States Patent [19]

Takatoshi

[11] Patent Number: 4,603,609
[45] Date of Patent: Aug. 5, 1986

[54] APPARATUS FOR CUTTING A SHEET-LIKE MEMBER APPLIED TO A SURFACE OF A SEMICONDUCTOR WAFER

[75] Inventor: Ono Takatoshi, Nagareyama, Japan

[73] Assignee: Disco Abrasive Systems, Ltd., Tokyo, Japan

[21] Appl. No.: 661,691

[22] Filed: Oct. 17, 1984

[30] Foreign Application Priority Data

Oct. 21, 1983 [JP] Japan ................................ 58-197359
Apr. 27, 1984 [JP] Japan ................................ 59-86557

[51] Int. Cl.$^4$ ............................................ B23B 37/00
[52] U.S. Cl. .................................. 82/51; 51/216 LP; 83/15; 83/171; 83/914; 82/DIG. 1; 219/68
[58] Field of Search ............... 51/216 LP; 219/68; 425/810; 82/51, DIG. 1; 83/15, 171, 914

[56] References Cited

U.S. PATENT DOCUMENTS 4,414,872  11/1983  Bard et al. ............................ 83/914

Primary Examiner—W. D. Bray
Attorney, Agent, or Firm—McDougall, Hersh & Scott

[57] ABSTRACT

The invention provides an apparatus for cutting a sheet-like member such as an adhesive tape applied to a surface of a semiconductor wafer at the periphery of said semiconductor wafer.

The apparatus comprises a heating rod to be brought into contact with the periphery of the semiconductor wafer, heating means for heating the heating rod, urging means for relatively urging the heating rod against the periphery of the semiconductor wafer, and a moving mechanism for relatively moving the heating rod along the periphery of the semiconductor wafer. The heating rod is moved relative to the periphery of the semiconductor wafer as the heating rod is urged against the periphery of the semiconductor wafer, and thereby the sheet-like member applied to the semiconductor wafer is melted and cut at the periphery of the semiconductor wafer.

In order to avoid a swell of the melted sheet-like member, a portion of the heating rod which is brought into contact with the periphery of the semiconductor wafer may defining a sharp cutting edge.

4 Claims, 8 Drawing Figures

APPARATUS FOR CUTTING A SHEET-LIKE MEMBER APPLIED TO A SURFACE OF A SEMICONDUCTOR WAFER

BACKGROUND OF THE INVENTION

1. Field of the Invention

The present invention relates to an apparatus for cutting a sheet-like member such as an adhesive tape applied to a surface of a semiconductor wafer at the periphery of said semiconductor wafer.

2. Description of the Prior Art

In the process of manufacturing a semiconductor device (chip), there is a step of grinding a semiconductor wafer such as a silicon wafer down to a predetermined thickness. Generally in this step, while the surface of a semiconductor wafer is chucked to a chuck table by vacuum suction, the back surface of the wafer is ground. In many cases, however, an element pattern is formed on the surface of the semiconductor wafer, so that chucking the said wafer surface directly onto the chuck table by vacuum suction leads to such inconvenience as damaging the element pattern or getting the surface contaminated with silicon dusts generated while grinding. As a consequence, it is a usual measure to apply an adhesive (sticky) tape onto the surface of the semiconductor wafer and thereby protect the wafer surface.

An adhesive tape, which is applied onto the wafer surface for the above purpose, must be cut along the outline of the semiconductor wafer, but such cutting has been conventionally carried out mechanically by use of a metallic blade.

Such a mechanical method of cutting, however, has caused the following problems.

When an adhesive tape is mechanically cut along the periphery of a semiconductor wafer by a cutting blade such as a metallic blade, this cutting blade is unavoidably pressed against the periphery of the semiconductor wafer with a considerably great strength. A peripheral portion of the semiconductor wafer may, as a consequence, be broken off by the cutting blade. In addition, it is another shortcoming that the wear of the said cutting blade is substantial due to the inevitable imposition of considerably large cutting resistance upon the cutting blade.

Furthermore, the outline of a semiconductor wafer generally is not a full circle and, in particular, may wave a straight portion called an orientation flat in the outer periphery thereof, as will be described later. By the method of mechanical cutting with a conventional blade, therefore, it is difficult to automatically move the cutting blade along the outline of the semiconductor wafer, so that the cutting operation of the adhesive tape had to be done manually by manpower.

Among various semiconductor wafers, particularly, those of such material as GaP or GaAs, some are broken off more easily than one made of silicon, and they also vary in outlines, thus causing an even bigger problem.

BRIEF SUMMARY OF THE INVENTION

Accordingly, it is an object of the present invention to provide an apparatus which can cut easily a tape without damaging semiconductor wafers.

It is another object of the present invention to provide a cutting apparatus which can follow automatically along the outline of a semiconductor wafer.

It is still another object of the present invention to provide a cutting apparatus which can be easily assembled into an automated manufacturing line for semiconductor devices.

The above object of the present invention is achieved by an apparatus for cutting a sheet-like member applied to a surface of a semiconductor wafer at the periphery of said semiconductor wafer, comprising a heating rod to be brought into contact with the periphery of the semiconductor wafer, heating means for heating the heating rod, urging means for relatively urging the heating rod against the periphery of the semiconductor wafer, and a moving mechanism for relatively moving the heating rod along the periphery of the semiconductor wafer, wherein the heating rod is moved relative to the periphery of the semiconductor wafer as it is urged against the periphery of the semiconductor wafer, and thereby the sheet-like member applied to the semiconductor wafer is melted and cut at the periphery of the semiconductor wafer.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENTS

Preferred embodiments of the present invention will now be described in accordance with the accompanying drawings with reference to a case wherein the present invention is applied to a tape cutting apparatus assembled in a fully automatic tape application apparatus.

Figure 1:
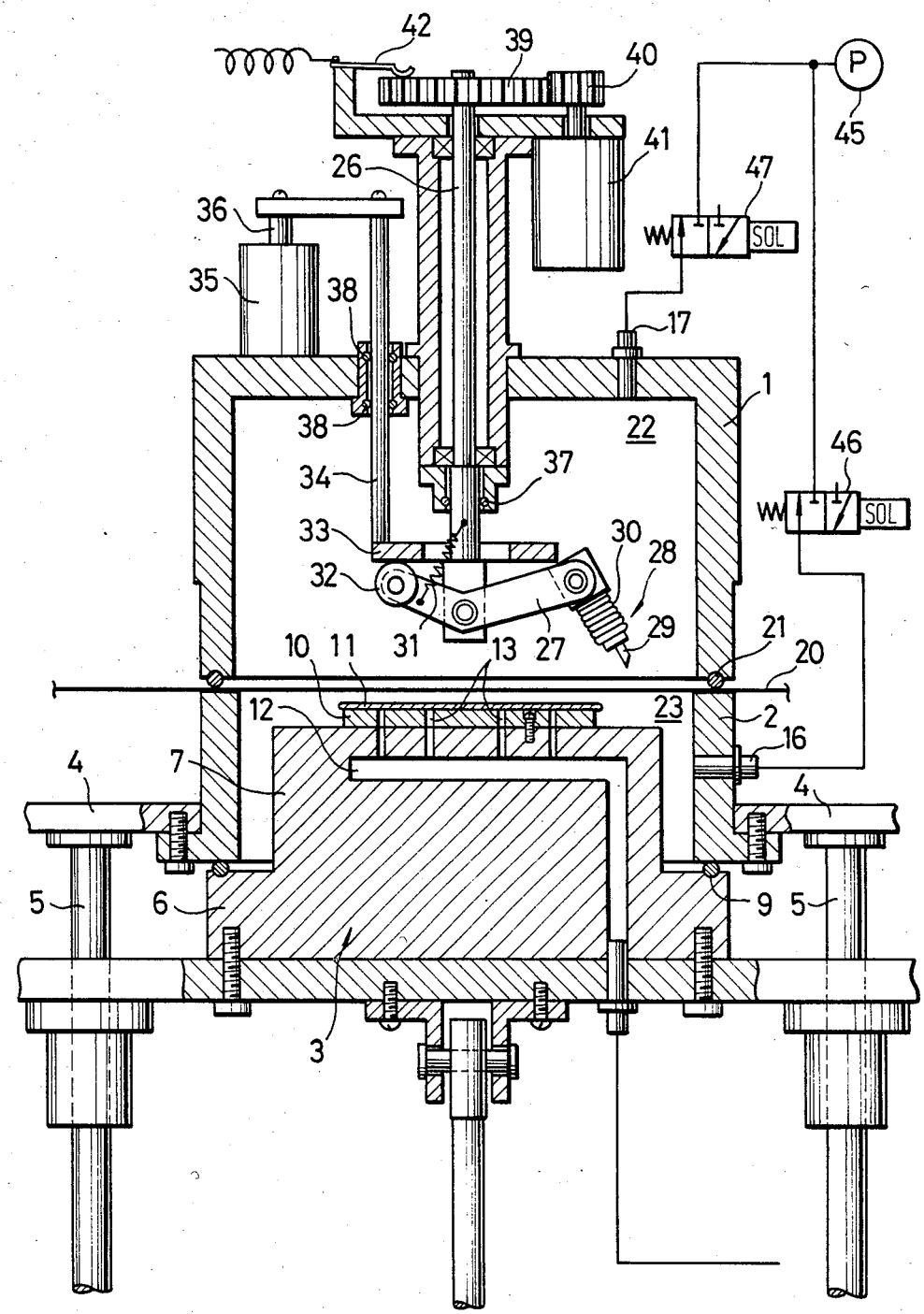
FIG. 1 is a schematic longitudinal sectional view of a tape application apparatus in which a heating and cutting apparatus according to an embodiment of the present invention is assembled.

As shown in FIG. 1, the tape application apparatus has substantially cylindrical upper and lower housings 1 and 2 comprising a vacuum chamber, and a mounting table 3.

The mount table 3 is slidably mounted on four guide shafts 5 fixed on a chassis 4. The mount table 3 is vertically moved by an air cylinder (not shown) connected to its lower surface. The mount table 3 consists of a large-diameter portion 6 and a small-diameter portion 7 to constitute a substantially projecting section. An O- ring 9 is mounted at the horizontal step between the large- and small-diameter portions 6 and 7. As shown in FIG. 1, when the mount table 3 is moved upward, the O-ring 9 is urged against the lower surface of the lower housing 2, so that the two members are airtightly sealed.

A disc-like wafer table 10 is mounted on the upper surface of the mount table 3. The diameter of the wafer table 10 is constituted slightly smaller than the minimal diameter (1 in FIG. 4) of a semiconductor wafer 11. When the semiconductor wafer 11 is placed on the wafer table 10, the whole outer periphery of the semiconductor wafer 11 projects outward from the wafer table 10. The wafer table 10 can be replaced with a suitable wafer table 10 in accordance with the size of the semiconductor wafer 11. A plurality of chucking holes 13 communicating with a vacuum suction chamber 12 formed in the mount table 3 are provided in the wafer table 10. The back surface of the semiconductor wafer 11 is chucked through these chucking holes 13.

The cylindrical lower housing 2 constituting a vacuum chamber is fixed to the chassis 4. A port 16 is formed in the outer wall of the lower housing 2 and is connected to a vacuum pump 45 through a vacuum valve 46.

Although not shown in the drawing, the upper housing 1 is pivotally supported at a pivot shaft fixed to the chassis 4 and can be opened and closed by an air cylinder. A vacuum suction port 17 is formed in the upper housing 1. The port 17 is also connected to the vacuum pump 45 through a vacuum valve 47.

An adhesive (sticky) tape 20 is arranged between the upper and lower housings 1 and 2. The adhesive tape 20 is suspended between supply and take-up reels (not shown) and is intermittently driven. Although not clearly illustrated in the drawing, the adhesive tape 20 has a width larger than the outer diameters of the upper and lower housings 1 and 2. When the upper housing 1 is closed and an O-ring 21 arranged at its lower surface is urged against the upper surface of the lower housing 2, the adhesive tape 20 separates the vacuum chamber into upper and lower hermetic chambers 22 and 23.

The construction of a heating and cutting apparatus mounted on the upper housing 1 will now be described with reference to FIGS. 1, 3A and 3B.

As shown in FIG. 1, a rotating shaft 26 of the heating and cutting apparatus is pivotally mounted along the central axis of the cylindrical upper housing 1. A substantially V-shaped pivot arm 27 is mounted on the side at the lower end of the rotating shaft 26 so as to be vertically pivotable. A heating unit 28 is mounted at one end (front end) of the pivot arm 27. The angle between the pivot arm 27 and the heating unit 28 can be properly changed in accordance with the size and shape of the semiconductor wafer 11.

Figure 3A:
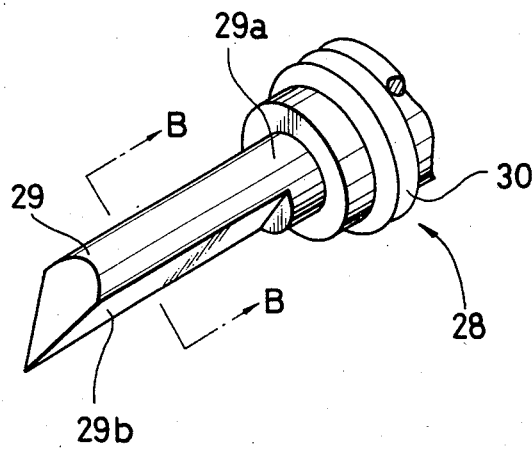
FIG. 3A is a partial enlarged perspective view of a heating rod of the heating and cutting apparatus.
Figure 3B:
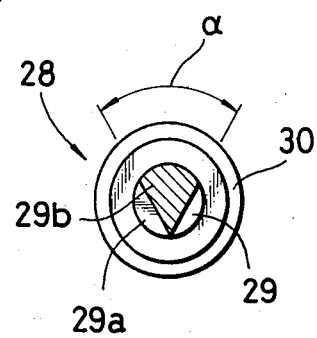
FIG. 3B is a sectional view taken along a line B—B in FIG. 3A.

As clearly shown in FIGS. 3A and 3B, the heating unit 28 has a heating rod 29 which is heated by a nichrome wire 30.

The heating rod 29 has a substantially columnar-shape support 29a. The support 29a is fitted to and supported by the main body of the heating unit 28. A distal end portion 29b of the heating rod 29 has an approximately triangular section so that a portion which is brought into contact with the periphery of the semiconductor wafer 11 defines a sharp cutting edges. This edge of the distal end portion 29b serves as a supplementary cutting edge.

The distal end portion 29b preferably has a dihedral angle α of about 30° to 90° and more preferably about 40° to 70°. When this angle α is too large, the function of the cutting edge is impaired. When the angle α is too small, however, the edge is easily broken off. The diameter of the support 29a is preferably within a range between about 1 mm and 3 mm. When the diameter of the support 29a is too large (e.g., about 5 mm or more), the amount of heat transmitted to the distal end portion 29b is too great, thus resulting in inconvenience. When the diameter of the support 29a is too small, however, the heating rod 29 is easily damaged.

From the viewpoint of wear resistance, the heating rod 29 preferably consists of a G class hard metal containing tungsten carbide. The heating rod 29, however, can consist of another type of hard metal, stainless steel, or a ceramic.

The heating temperature of the heating rod 29 is selected in accordance with the adhesive tape material, the moving speed and diameter of the heating rod and so on. In general, however, the heating temperature of the heating rod 29 is preferably within the range between about 70° C. and 500° C., more preferably within the range between about 100° C. and 350° C., and still more preferably within the range between about 150° C. and 300° C. When the heating temperature is too low, the adhesive tape 20 is difficult to melt and cut. If the heating temperature is too high, however, the semiconductor wafer 11 is adversely affected by heat. When the heating temperature is within the range defined above, the adverse effect of heat on the semiconductor wafer 11 can be easily avoided by moving the heating unit 28 at such a high speed so that the effect of heat may be ignored.

As shown in FIG. 1, the pivot arm 27 is biased to the clockwise direction by a spring 31 interposed between the arm 27 and the rotating shaft 26. An abutment portion 32 is arranged at the rear end of the pivot arm 27. A doughnut-like press plate 33 surrounds the rotating shaft 26. When the press plate 33 presses the abutment portion 32 of the pivot arm 27 downward, the pivot arm 27 is pivoted counterclockwise against the biasing force of the spring 31.

A slide shaft 34 is vertically slidably supported in the upper housing 1 and the press plate 33 is fixed to the lower end of the slide shaft 34. The upper end of the slide shaft 34 is connected to the piston rod 36 of an air cylinder 35 so that the slide shaft 34 is vertically moved thereby. O-rings 37 and 38 airtightly seal between the upper hermetic chamber 22 and the rotating shaft 26 and between the chamber 22 and the slide shaft 34, respectively.

A large-diameter gear 39 is fixed to the upper end of the rotating shaft 26. The rotating shaft 26 is driven by a motor 41 through the gear 39 and a small-diameter gear 40. A ring-like electrode (not shown) is formed on the upper surface of the large-diameter gear 39. A drive current is supplied to the heating unit 28 through a contact 42 in contact with this ring-like electrode.

Figure 7:
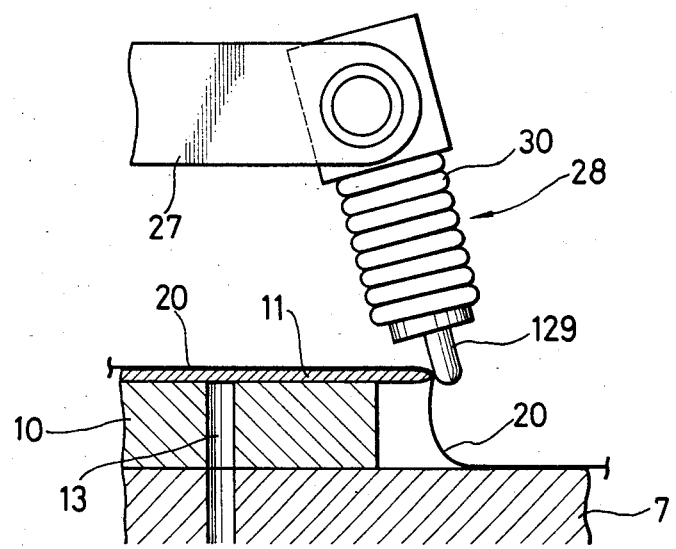
FIG. 7 is a partial enlarged longitudinal sectional view similar to FIG. 5 and showing a modification of the heating rod.

In this embodiment, the heating rod 29 having an approximately triangular section is used. A heating rod 129 having a fully circular section, however, can also be used as shown in FIG. 7. In this case, the heating rod 129 does not have a supplementary cutting edge, while the heating rod 129 can melt and cut the adhesive tape 20 with heat.

The heating rod 29 of the above embodiment has the following advantages over the heating rod 129 shown in FIG. 7.

Figure 5:
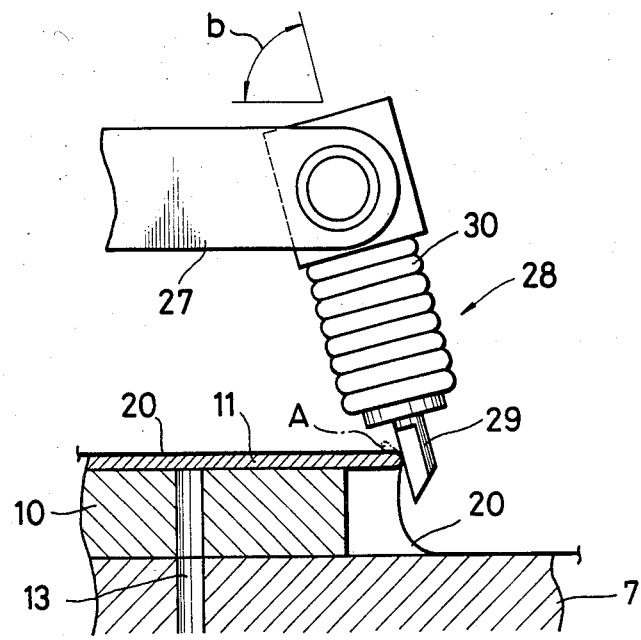
FIG. 5 is a partial enlarged longitudinal sectional view of the apparatus shown in FIG. 2 wherein the heating rod is abutted against the semiconductor wafer.

When the adhesive tape 20 is melted and cut with a columnar rod such as the heating rod 129 shown in FIG. 7, the melted adhesive tape 20 may form a swell or rolled-up portion on the upper surface of the semiconductor wafer 11 as indicated by reference symbol A in FIG. 5. In order to grind the semiconductor wafer 11, the adhesive tape surface on the upper surface of the wafer is used as a reference surface. If such a swell is present in the adhesive tape, therefore, correct grinding cannot be performed. If the cutting temperature is decreased to prevent formation of such a swell in the adhesive tape 20, the tape cannot be cut completely. As a result, some portion of the tape 20 not being cut off remains around the wafer 11 to project outwad therefrom. In contrast to this, the heating rod 29 of this embodiment of the present invention has a supplementary cutting edge. Therefore, the heating rod 29 can effectively avoid a swell in the adhesive tape 20 as described above.

The operation of the tape application apparatus having the construction described above will now be described.

At first, the mounting table 3 is moved downward. The semiconductor wafer 11 is supplied onto the mounting table 3 while the latter is kept at its lower position. The semiconductor wafer 11 is aligned with respect to the wafer table 10 of the mount table 3 and is chucked to the chucking holes 13 by vacuum suction. Thereafter, the mount table 3 is moved upward and the semiconductor wafer 11 is brought to a predetermined tape application position, as shown in FIG. 1. At the same time, the mount table 3 and the lower housing 2 are sealed.

The upper housing 1 is opened upward by an opening and closing drive unit (not shown). During this operation, the adhesive tape 20 is intermittently supplied to a predetermined position. The upper housing 1 is then closed. The upper and lower housing 1 and 2 are sealed so that the adhesive tape 20 is interposed therebetween. The vaccum chamber is separated into the upper and lower hermetic chambers 22 and 23 by the adhesive tape 20. At this time, the press plate 33 is kept at the lower position by the operation of the air cylinder 35 so that the press plate 33 is urging the abutment portion 32 of the pivot arm 27 downward. The heating unit 28 mounted at the front end of the pivot arm 27 is held at a position which is distant from the ahesive tape 20, as shown in FIG. 1.

In this state, the upper and lower hermetic chambers 22 and 23 are synchronously evacuated by the vacuum pump 45 through the ports 17 and 16 and the vacuum valves 47 and 46, respectively. The preferable degree of negative pressure differs in accordance with the properties of the adhesive tape 20, etc. and can be, for example, 10 to 250 mmHg. When this negative pressure is too high, bubbles are formed between the adhesive tape 20 and the semiconductor wafer 11. When this negative pressure is too low, however, a considerable period of time is required to obtain the pressure and so productivity is lowered. As the tape 20, any type of adhesive tape can be used with or without paste, if it can be cut with heat.

Figure 2:
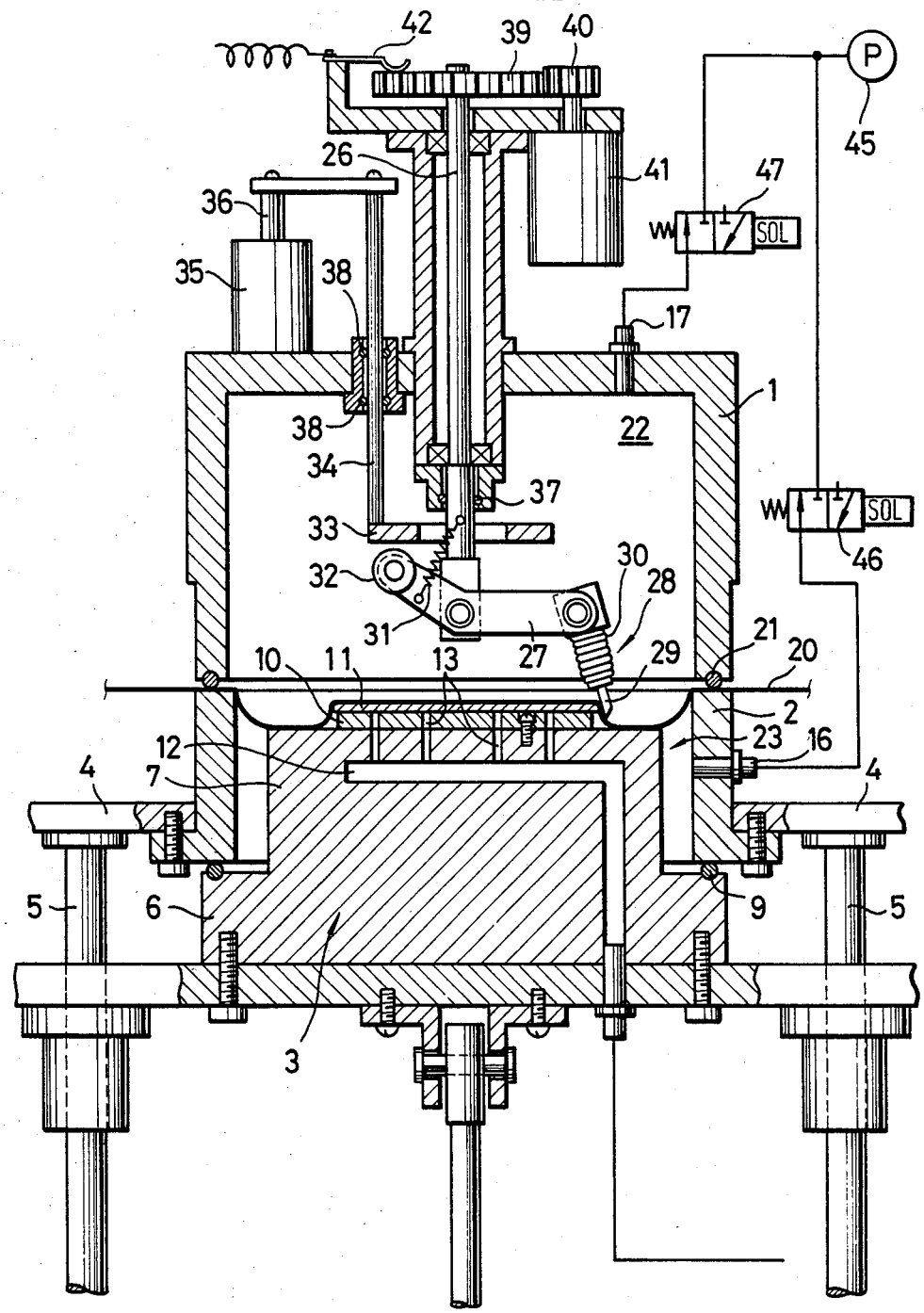
FIG. 2 is a shematic longitudinal sectional view of the apparatus same as shown in FIG. 1 illustrating the state wherein the applied tape is cut.

Subsequently, as shown in FIG. 2, only the upper hermetic chamber 22 is released to the atmospheric pressure through the vacuum valve 47. The adhesive tape 20 is thereby urged against and applied to the surface of the semiconductor wafer 11 due to the air pressure difference between the upper and lower hermetic chambers 22 and 23, as shown in FIG. 2. In this embodiment since the air pressure difference between the upper and lower hermetic chambers 22 and 23 is utilized, the adhesive tape 20 is applied so as to wrap the periphery of the semiconductor wafer 11, as shown in FIG. 5.

The tape application method as described above has the following advantages. Since the adhesive tape 20 is urged against the semiconductor wafer 11 by air pressure, the element pattern formed on the surface of the semiconductor wafer 11 is not damaged, unlike the conventional mechanical method using a roller or the like. Furthermore, since the lower hermetic chamber 23 is in a substantially evacuated state during the tape application, bubbles are not formed between the adhesive tape 20 and the semiconductor wafer 11. The adhesive tape 20 can be easily and uniformly applied to the surface of the semiconductor wafer 11.

The cutting operation of the adhesive tape 20 by the tape cutting apparatus will now be described with reference to FIGS. 2 and 4 to 6.

Figure 4:
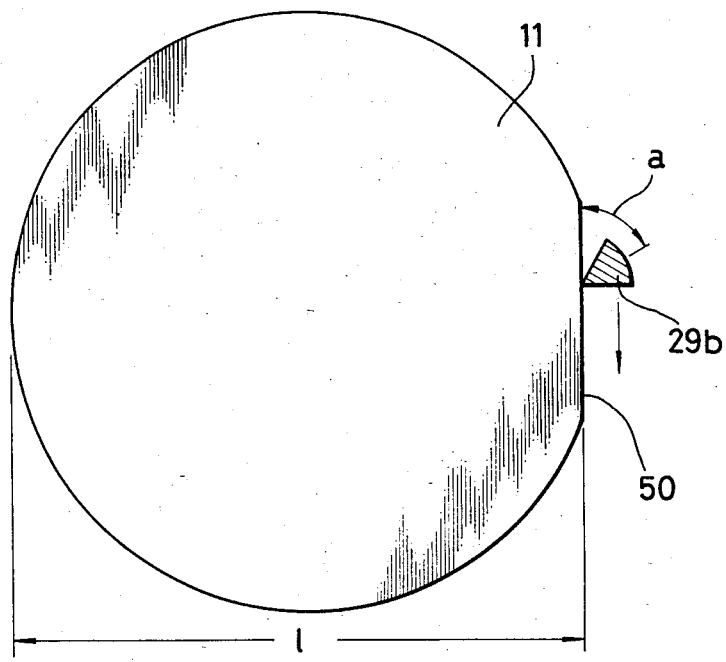
FIG. 4A is an enlarged plan view showing a shape of a semiconductor wafer.
Figure 6:
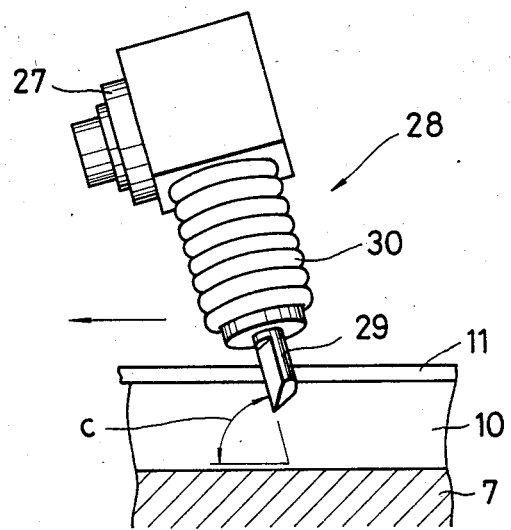
FIG. 6 is a partial enlarged longitudinal sectional view similar to FIG. 5 but viewed from a different angle.

The heating rod 29 of the heating unit 28 is heated to a predetermined temperature and is driven and rotated by the motor 41. After the adhesive tape 20 is applied to the semiconductor wafer 11 in the manner described above, the air cylinder 35 drives the slide shaft 34 to slide upward so that the press plate 33 is moved upward, as shown in FIG. 2. The pivot arm 27 pressed to the press plate 33 is thereby rotated clockwise by the biasing force of the spring 31. The heating rod 29 mounted at the distal end of the pivot arm 27 is rotated around the rotating shaft 26 and is moved downward. As shown in the enlarged view in FIG. 5, the heating rod 29 is brought into contact with the adhesive tape 20 applied to the periphery of the semiconductor wafer 11. As shown in FIG. 2, the abutment portion 32 of the pivot arm 27 is then separated from the press plate 33. The heating rod 29 of the heating unit 28 is thereby urged against the adhesive tape 20 by the biasing force of the spring 31 as it is moved along the outer periphery of the semiconductor wafer 11. At this time, as shown in FIG. 4, the central axis of the dihedral angle of the heating rod 29 is preferably inclined backward at an angle a=60° in relation to its moving direction (indicated by the arrow). Furthermore, as shown in FIG. 5, an angle b between the longitudinal axis of the heating rod 29 and the upper surface of the semiconductor wafer 11 is preferably about 80°. As shown in FIG. 6, the longitudinal axis of the heating rod 29 is preferably inclined at an angle c=75° to its moving direction (indicated by the arrow).

As described above, the heating rod 29 of the heating unit 28 is heated to a predetermined temperature. The portion of the adhesive tape 20 which contacts with the heating rod 29 is melted and cut by heat.

As described above, in this embodiment, the adhesive tape 20 is melted and cut mainly by heat. Therefore, the urging force to press the heating rod 29 against the periphery of the semiconductor wafer 11 can be kept small as compared to the conventional method wherein the tape is mechanically cut only with a blade. For this reason, according to the method of this embodiment, the semiconductor wafer 11 is seldom damaged. In this embodiment, the portion of the heating rod 29 which is brought into contact with the tape 20 is formed into an edge. This portion serves as a supplementary cutting edge. As a result, the swell in the adhesive tape 20 indicated by an imaginary line (symbol A) in FIG. 5 or incomplete tape cutting as described above can be effectively avoided. Furthermore, since the method of the present invention adopts cutting mainly by heat, the cutting resistance acting on the heating rod 29 is smaller than that in the conventional mechanical cutting only with a blade. For this reason, the wear of the heating rod 29 can be considerably reduced as compared to that of the blade of the conventional mechanical method. Since the heating rod 29 is brought into contact with the semiconductor wafer 11 (to be exact, through the adhesive tape 20) as it is being rotated, the influence of heat acts uniformly on the semiconductor wafer 11 so that the wafer 11 is not locally overheated.

The heating unit 28 is moved along the outline of the semiconductor wafer 11 upon the driving operation of the motor 41. At this time, the abutment portion 32 of the pivot arm 27 is separated from the press plate 33, so that the heating rod 29 of the heating unit 28 is urged against the verge of the semiconductor wafer 11 (through the adhesive tape 20) by the biasing force of the spring 31. The heating rod 29 can therefore automatically follow along the outline of the semiconductor wafer 11.

This operation will be described with reference to FIG. 4 in more detail. The shape of the semiconductor wafer 11 is approximately circular. In general, however, a straight poriton 50 called an orientation flat is provided in the outer periphery of the semiconductor wafer 11 for indicating the crystal orientation of the semiconductor. In the conventional mechanical method, the blade must be manually moved to cut the tape at the portion of this orientation flat. In some cases, a semiconductor wafer of more complex shape, for example, having plural orientation flats is used. In such a case, it is more difficult to correctly cut the tape without damaging the semiconductor wafer.

In this embodiment of the present invention, however, the heating unit 28 is normally urged toward the periphery of the semiconductor wafer 11 by the spring 31. For this reason, when the heating rod 29 of the heating unit 28 comes to the position of the orientation flat 50, it is automatically moved inward along the line of the orientation flat 50. Therefore, the heating rod 29 is not separated from the periphery of the semiconductor wafer 11. In this apparatus, the tape can be easily and correctly cut also at the portion of the orientation flat 50 without requiring a special control unit. This apparatus can properly cut the tape applied to a semiconductor wafer of a different size or more complex shape in the same manner as described above. For example, a semiconductor wafer having one or more V notches in place of the orientation flat in its outer periphery has been used. The heating and cutting apparatus of the present invention was confirmed to be able to follow the outline of such a semiconductor wafer and cut the adhesive tape applied thereto without troubles.

The semiconductor wafer 11 from which the tape 20 has been cut is moved downward together with the mount table 3 and is supplied to a predetermined subsequent step. In this time, the lower hermetic chamber 23 is communicated with the upper hermetic chamber 22 and has been released to the atmospheric pressure.

Thereafter, the above operation is repeated to automatically apply the adhesive tape 20 to semiconductor wafers and cut the applied tape, one after another.

In the above embodiment, an adhesive member in the form of a tape is applied to a semiconductor wafer. The present invention, however, is similarly applicable when a sheet member of rectangular shape, circular shape, etc. is applied to a semiconductor wafer. In the above embodiment, the heating unit 28 is rotated, while the semiconductor wafer may be rotated instead of the heating unit 28.

As has been described above, in accordance with the present invention, a sheet-like member applied to the surface of a semiconductor wafer is melted and cut with heat of a heating rod. Therefore, the urging force for urging the heating rod against the periphery of the semiconductor wafer can be considerably smaller than that required in the conventional mechanical cutting method using only a blade. The semiconductor wafers are thus seldom damaged. Besides, since the cutting resistance acting on the heating rod is reduced, wear of the heating rod is reduced as compared to a conventional blade. Since the heating rod is relatively rotated as it is urged against the periphery of the semiconductor wafer, the heating rod can easily follow various shapes or sizes of semiconductor wafers. The tape cutting step can therefore be simplified, so it can be easily included in the fully automated semiconductor device manufacturing process. As a result, the manufacturing cost of semiconductor devices can be reduced.

What is claimed is:

1. An apparatus for melting and cutting a sheet-like member applied to a surface of a semiconductor wafer at the edges of said semiconductor wafer, comprising:
   a base, said base including a support for said semiconductor wafer;
   support means for said heating rod;
   means for heating said heating rod;
   means for urging said heating rod relatively against said edges of said semiconductor wafer attached to said means for said rod support means; and
   a moving mechanism attached to the end of said support means relatively moving said heating rod along said edges of said semconductor wafer;
   whereby said heating rod is relatively moved along said edges of said semiconductor wafer as the former is relatively urged against the latter so that said sheet-like member applied to said semiconductor wafer is melted and cut at said edges of said semiconductor wafer.

2. An apparatus according to claim 1 wherein said moving mechanism is a mechanism for rotating either said heating rod or said semiconductor wafer around the central axis of said semiconductor wafer.

3. An apparatus according to claim 1 wherein said means first mentioned for supporting said heating rod comprises a housing, a rotary shaft, and a pivot arm; said heating rod being fixed to an end of said pivot arm, said pivot arm being pivotally connected to an end of said rotary shaft, said rotary shaft extending along the central axis of said semiconductor wafer and being rotatably and slideably borne by said housing.

4. An apparatus according to claim 1 wherein said means for urging said heating rod is a spring disposed between said rotary shaft and said pivot arm to urge said heating rod to said edges of said semiconductor wafer.

* * * * *